United States Patent [19]

Anderson et al.

[11] 4,037,864
[45] July 26, 1977

[54] PIPE COUPLING

[75] Inventors: Leslie T. Anderson; Arthur D. Thompson; Iamo Kairbara, all of London, Canada

[73] Assignee: Emco Ltd., London, Canada

[21] Appl. No.: 722,357

[22] Filed: Sept. 13, 1976

Related U.S. Application Data

[63] Continuation-in-part of Ser. No. 567,648, April 14, 1975, abandoned.

[51] Int. Cl.² ............................................. F16L 17/02
[52] U.S. Cl. .................................... 285/342; 285/348; 285/382.7
[58] Field of Search ............ 285/348, 342, 341, 382.7, 285/94

[56] References Cited

U.S. PATENT DOCUMENTS

| 2,240,021 | 4/1941 | Rutherford | 285/94 X |
| 2,320,812 | 6/1943 | Cowles | 285/382.7 X |
| 2,351,363 | 6/1944 | Parker et al. | 285/382.7 X |
| 2,701,149 | 2/1955 | Kreidel et al. | 285/382.7 X |
| 3,075,793 | 1/1963 | Lennon et al. | 285/382.7 X |
| 3,248,136 | 4/1966 | Brozek et al. | 285/382.7 X |
| 3,441,297 | 4/1969 | Koski | 285/342 |

FOREIGN PATENT DOCUMENTS

| 1,233,372 | 5/1971 | United Kingdom | 285/382.7 |

Primary Examiner—Dave W. Arola
Attorney, Agent, or Firm—Fetherstonhaugh & Co.

[57] ABSTRACT

This invention relates to a compression joint of the type used to connect the end of a piece of compressible pipe to a corporation fitting such as a curb stop, a main stop or a ball valve. The pipe is usually soft copper the wall of which is compressible, but it can be plastic and may, in the future, tend to be plastic rather than copper. The joint includes a nut threaded onto a sleeve; the nut and sleeve and an inserted pin forming a chamber which receives a split compression ring, a spacer tube, and a compressible gasket. The compression ring and gasket are urged into engagement with the pipe when the size of the chamber is reduced as the nut is threaded onto the sleeve.

3 Claims, 4 Drawing Figures

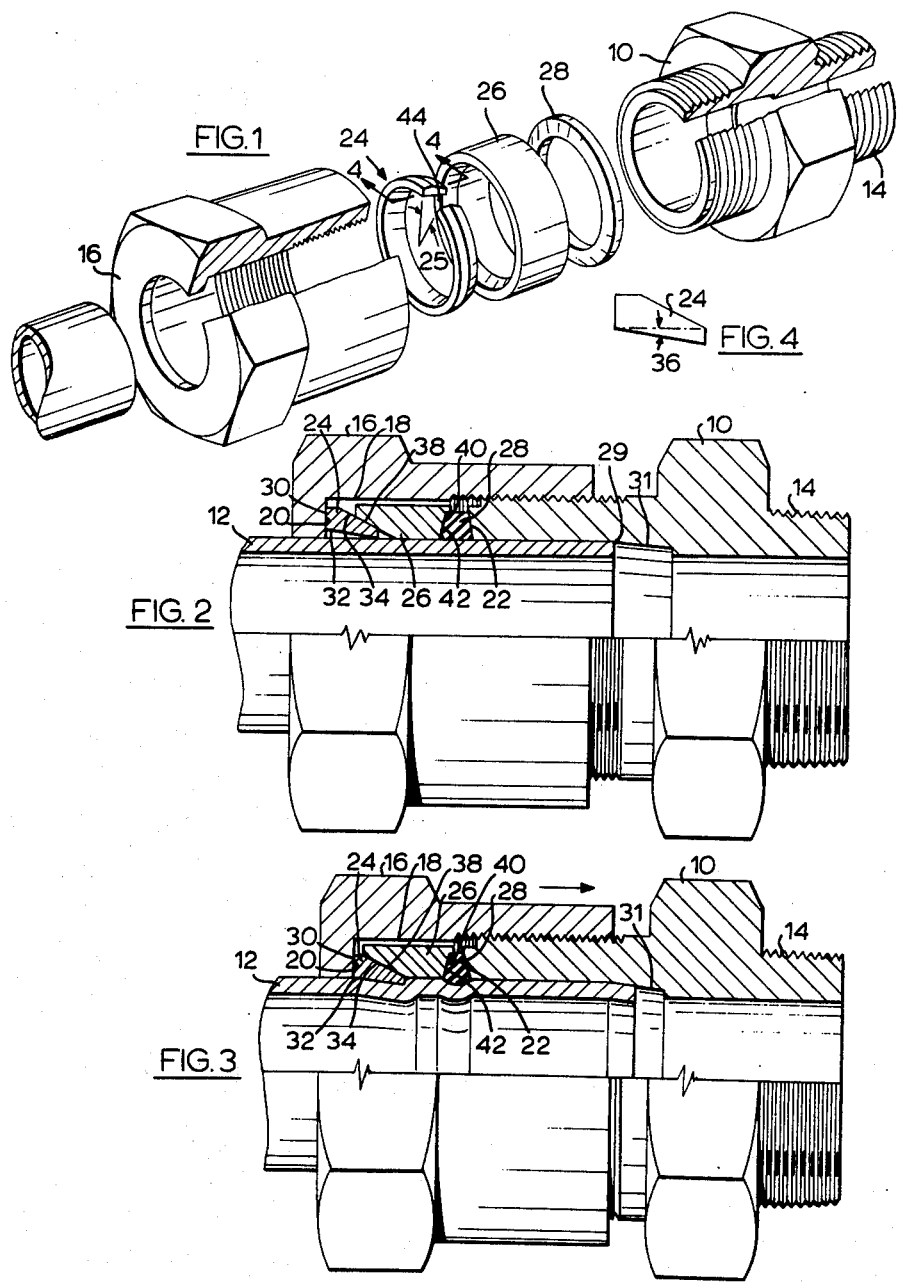

PIPE COUPLING

This application is a continuation in part of United States Patent Application Ser. No. 567,648 filed Apr. 14, 1975 and now abandoned.

There is a heavy demand for compression joints to connect pipe ends to fittings and many competitive designs are available. Many of these fittings and the pipe with which they interconnect are underground and subject to unusual pullout forces on occasion. For example, an underground water main including a compression joint may be accidentally pulled by a piece of construction digging equipment. In such a case it is necessary that the joint have a high resistance to pullout.

The compression joint of this invention is simple in design and has an extraordinarily high resistance to pullout.

A compression joint for connection with a compressible pipe having an outside wall according to this invention comprises a sleeve formed with external threads and having an end wall and having a bore with a central axis extending therethrough to receive the end of said compressible pipe; a nut having a threaded interior axially extending side wall and a radial end wall extending normal to said axis and having an opening to admit the end of said compressible pipe in use; said side wall of said nut, said radial end wall of said nut and said end wall of said sleeve combining with the outside wall of a said compressible pipe when inserted in said bore in use to define a compression chamber; a split compression ring of non-deformable cross section in said chamber and having a radial back wall extending normal to said axis and abutting said radial end wall of said nut when said nut is threadedly tightened on said sleeve, the ring having an outer wall tapering inwardly toward the pipe away from the ring's radial wall, the ring having a front wall between said outer wall and said inner wall, the ring having an inner pipe wall compressing wall tapering inwardly toward the pipe away from the ring's radial wall, and the pipe compressing wall terminating at its inner extent in a sharp edge at said front wall to form an inwardly directed protuberance adapted to lead into the wall of a compressible pipe as the wall compressing wall compresses the wall of a pipe when the nut is threadedly thightened on the sleeve in use, said pipe wall compressing wall having an axial extent that is longer than its radial extent, a compressible gasket in said compression chamber disposed against said end wall of the sleeve and having at least one axially inclined wedge wall; and a spacer tube in said chamber surrounding said pipe and disposed between said compression ring and said gasket, the tube having an inclined wall contacting and complimentary with the tapered outer wall of the split ring and the tube having a wedge wall contacting said gasket, whereby to cause said gasket and said split compression ring to move radially inwardly to grip said compressible pipe in use due to wedging action as the distance between said end wall of said sleeve and said end wall of said nut is reduced by threadedly tightening said nut on said sleeve.

The invention will be clearly understood after reference to the following detailed specification read in conjunction with the drawings.

In the drawings:

FIG. 1 is an exploded view of the component parts of a compression joint according to this invention;

FIG. 2 is a side view partially in section of a compression joint before tightening;

FIG. 3 is a view similar to FIG. 2 showing the compression joint after tightening; and FIG. 4 is a view along the line 4—4 of FIG. 1.

The numeral 10 refers to a sleeve which is counterbored to receive the end of a piece of pipe 12 the wall of which is compressible. Sleeve 10 is designed with a tapered thread 14 for connection to a water or like conducting fitting such as a curb stop, a main stop or a ball valve. Alternatively, the sleeve could be formed as part of such a fitting. It is customarily made of brass.

Numeral 16 refers to a nut that threadedly engages with the sleeve 10 as illustrated. Nut 16 is also customarily made of brass and it has an interior axially extending side wall 18 and an end wall 20 that extends radially inwardly. Sleeve 10 has an end wall 22.

The side wall 18 of the nut, the end wall 20 of the nut and the end wall 22 of the sleeve 10 are adapted to combine with the outside wall of the compressible pipe 12 to define a compression chamber for the split compression ring 24, the spacer tube 26 and the compressible gasket 28 which are arranged in serial wedging relation between the end wall 22 of the sleeve 10 and the end wall 20 of the nut 16 to cause the gasket and the compression gripper ring to move radially inwardly to grip the compressible pipe in use due to wedging action as the distance between the end wall of the sleeve and the end wall of the nut is reduced by threading the nut onto the sleeve as will be explained.

The split compression ring 24 is also preferably made of brass and has a radially extending wall 30 for abutting engagement with the end wall 20 of the nut, a pipe-wall compressing wall 32 with an axial component of extent for engagement with the compressible pipe 12 and a wedge wall 34. The pipe-wall compressing wall tapers inwardly toward the pipe and away from the ring's radial wall. FIG. 4 is an enlarged cross-section of the compressing ring 24. There is a radial as well as an axial component to the direction of the wall 32. The leading protuberance thus created is designed to lead into the compressible pipe as the compression ring is closed thereon in use as will be explained later. A protuberance formed by making the angle 36 about 6° has been found well suited for a compression ring for pipe 12 made of copper. Other forms of leading protuberance will be apparent to those skilled in the art. If one makes the angle smaller the ring 24 seats on the surface of the pipe sooner during tightening and because of the greater surface contact greater tightening forces are required. The opposite is true for an increase in the angle. The important characteristic is that the axial extent of the pipe-wall compressing surface be greater than the radial extent. The slope in each case will be one that achieves a seating of the surface with the desired amount of radial deformation to get a good anchorage. For a ¾ inch copper pipe the angle shown is 6° and the radial deformation is 0.03 inches at the protuberance.

Ring 24 is substantially non-compressible in relation to the material of the side wall of the pipe. It does not deform as the pipe walls are deformed. Moreover, it does not deform on pullout as the pipe is drawn over the protuberance of the ring.

The spacer tube 26 has axially inclined wedge walls 38 and 40 which are designed to cooperate in wedging relation with the outer or wedge wall 34 of compression ring 24 and the wedge wall 42 of the gasket 28, respectively. Outer wall 34 and pipe-wall compressing wall 32 are joined by a front wall.

The gasket 28 is partially contained at its outer surface by a lip on the sleeve and adhesively secured to the spacer tube 26 prior to assembly to keep the gasket centred with respect to the spacer and allow entry of the pipe without misalignment of parts. In use one serially arranges the compression ring 24, the spacer tube 26 and the gasket 28 in the nut 16 as illustrated and threads the nut onto the sleeve. The end of the pipe 12 is then inserted into the sleeve to abut the stop 29 defined by the commencement of the taper 31 therein as shown in FIG. 2. The compression joint is then ready for tightening and the mechanic merely takes a wrench and tightens the nut 16. As he does so the serially arranged wedge components in the compression chamber are compressed between the end wall 20 of the nut and the end wall 22 of the sleeve 10. The spacer tube 26 cannot yield in a radial direction with the result that the gasket 28 is caused to flow downwardly against the pipe 12 to deform it and make a tight seal and the compression ring 24 moves radially inwardly to compress and deform the wall of pipe 12 as it is carried forward by the nut. Compression ring 24 is split as at 44 and as it moves inwardly the spacing between the ends at the split decreases.

The gasket 28 is caused to move downwardly against the pipe 12 by the wedging surfaces of the end of the sleeve 10 and the end of the spacer tube 26. Preferably, both surfaces are sloped to cause the gasket to flow downwardly as described but if only one of the surfaces is sloped it preferably is the surface 22. One does not particularly want the gasket material 28 to flow upwardly towards the nut 16.

When, due to tightening of the nut 16 on the sleeve 10, the ends of the compression ring at the split 44 touch, there can, of course, be no further radially inward movement of the compression ring and, as the nut is tightened further, any further possible tightening of the nut could only serve to compress the gasket to a greater extent. But, while there is an open space between the ends of the compression ring at the split 44 there will be radially inward movement of the compression ring with tightening of the nut. There will also be an axial movement of the compression ring with a tightening of the nut. Preferably the size of the split 44 between the ends of the compression ring 24 in the relaxed position is such that the compression ring 24 will have embedded itself in the copper tube 12 to an optimum degree when the space 44 is closed. At this stage there will be a substantial increase in torque required for further tightening because there can be no further wedging movement between the compression ring and the spacer tube. Thus, the operator has an indication of optimum tightening of the nut on the sleeve. The opening 44 on a ring for a ¾ inch copper pipe should make an angle 25 of about 28° in a relaxed condition.

As noted above there is axial movement as well as radial movement of the compression ring 24 due to the wedging action caused by tightening of the nut 16. The initial axial movement of the compression ring is a sliding one along the pipe 12, but once there has been sufficient radial movement of the compression ring 24 it grips the pipe with a force that will not permit axial sliding movement of the compression ring with respect to the pipe 12. Any further axial movement of the ring 24 carries the pipe 12 with it.

The bore of the sleeve 10 is, as noted above, formed with a bore to receive the free end of the pipe 12 and has a shoulder 29 that acts as a stop means to the force of manual entry of the pipe 12. If the shoulder 29 is an absolute stop to further entry of the free end of the pipe into the bore of the sleeve 10 then axial movement of the compression ring 24 after it firmly grips the pipe 12 will have to compress or buckle the free end of the pipe against the stop means. This compression or buckling action will take a very large force and the torque on the nut 16 required to achieve it will be very high.

The difficulty of the high torques required to compress or buckle the free end of the pipe against an absolute stop means is avoided by forming the walls of the bore in the sleeve axially beyond the stop of a restricted diameter to form a limited resistance to further entry of the pipe beyond the stop means. Thus, the stop means 29 is designed to locate the free end of the pipe 12 in the sleeve 10 upon entry of the pipe under the force of manual entry and the inward taper is designed to admit the pipe in an axial direction beyond the stop means under the force not substantially greater than those of manual entry and caused by tightening of the nut 16. With such an arrangement there is very much reduced resistance to entry of the pipe after the compression ring grips the pipe and the torques required in order to close the gap in the compression ring to achieve sufficient radial movement for a firm grip as illustrated in FIG. 3 are reduced to a magnitude that can be manually applied with the relative ease.

The resistance to pullout of the pipe 12 from the tightened joint is a function of the effectiveness of the entry of the compression ring into the pipe. It will be apparent that on pullout one must draw the pipe through the compression ring that engages it. The pipe must be deformed at the compression ring.

The spacer tube 26 must be of sufficient length to separate the compression ring 24 and gasket 28 a distance that will avoid easy pullout. It will be apparent that if the compression ring and gasket were too close together and the deformations of the pipe caused by them were to merge, pullout would be facilitated.

The resistance to the tightening of the nut on the sleeve can be materially reduced by providing a suitable conductive lubricant on the radially extending wall 30 and the axially inclined wedge wall 34 of the compression ring 24 and to the threadedly engaging surfaces of the sleeve and to the axially inclined end wall 22 of the sleeve 10. With these surfaces coated with a graphite lubricant it has been found that the nut of a compression joint can be tightened on the sleeve to cause the compression ring to deform the pipe 12 an optimum amount to achieve maximum pullout strength with a torque applied to the nut of 45 food-pounds. The space at the split 44 of the compression ring was adjusted so that the space closed upon optimum deformation of the pipe 12.

A compression joint tightened as just explained will withstand a pullout force in the order of 4,000 pounds for ¾ inch copper pipe.

It is often a requirement of a corporation coupling that it conduct electricity because in colder climates pipes become frozen. The standard method of thawing them is to pass an electric current through the pipe. With the present coupling electricity is readily conducted from one pipe through the sleeve 10 through the nut 16 through the compression ring 24 to the connected pipe 12. All connections are tight electrical connections in the path, but if a lubricant is used on the threads between the nut and the sleeve it should be an electricity conducting one.

What we claim as our invention is:

1. A compression joint for connection with a compressible pipe having an outside wall comprising;
   a. a sleeve formed with external threads and having an end wall and having a bore with a central axis extending therethrough to receive the end of said compressible pipe;
   b. a nut having a threaded interior axially extending side wall and a radial end wall extending normal to said axis and having an opening to admit the end of said compressible pipe in use;
   c. said side wall of said nut, said radial end wall of said nut and said end wall of said sleeve combining with the outside wall of a said compressible pipe when inserted in said bore in use to define a compression chamber;
   d. a split compression ring of non-deformable cross-section in said chamber and having a radial back wall extending normal to said axis and abutting said radial end wall of said nut when said nut is threadedly tightened on said sleeve, the ring having an outer wall tapering inwardly toward the pipe away from the ring's radial wall, the ring having an inner pipe-wall compressing wall tapering inwardly toward the pipe away from the ring's radial wall, the ring having a front wall between said outer wall and said inner pipe-wall compressing wall, and the pipe compressing wall terminating at its inner extent in a sharp edge at said front wall to form an inwardly directed protuberance adapted to lead into the wall of a compressible pipe as the pipe-wall compressing wall compresses the wall of a pipe when the nut is threadedly tightened on the sleeve in use, said pipe-wall compressing wall having an axial extent that is longer than its radial extent;
   e. a compressible gasket in said compression chamber disposed against said end wall of the sleeve and having at least one axially inclined wedge wall; and
   f. a spacer tube in said chamber surrounding said pipe and disposed between said compression ring and said gasket, the tube having an inclined wall contacting and complimentary with the tapered outer wall of the split ring and the tube having a wedge wall contacting said gasket, whereby to cause said gasket and said split compression ring to move radially inwardly to grip said compressible pipe in use due to wedging action as the distance between said end wall of said sleeve and said end wall of said nut is reduced by threadedly tightening said nut on said sleeve.

2. A compression joint as claimed in claim 1 in which the ends of said compression ring at the split therein are adapted to meet when there has been a predetermined amount of inward radial movement of said compression ring, said pipe-wall compressing wall of said compressing ring embedding itself in said pipe in use with said predetermined amount of inward radial movement to give a high resistance to further tightening of said nut on said sleeve and a high resistance to pullout force applied to said compressible pipe in use.

3. A compression joint as claimed in claim 1 in which said sleeve is formed with a bore as aforesaid to receive said pipe, said bore having a side wall formed to act as a stop means to manual entry of the free end of a pipe, the walls of said bore that extend axially beyond said stop means being tapered inwardly to resist further entry of said pipe beyond said stop means under the force of manual entry but to admit said pipe beyond said stop means under axial force not substantially greater than those of the force of manual entry.

* * * * *